US011396920B2

(12) United States Patent
Zhang

(10) Patent No.: US 11,396,920 B2
(45) Date of Patent: Jul. 26, 2022

(54) METHOD FOR IMPROVING BRAKING PERFORMANCE OF MICROPOROUS FRICTION MATERIALS UNDER WET CONDITIONS

(71) Applicant: SHANGHAI REINPHEN NEW MATERIAL TECHNOLOGY CO., LTD., Shanghai (CN)

(72) Inventor: Dingquan Zhang, Shanghai (CN)

(73) Assignee: SHANGHAI REINPHEN NEW MATERIAL TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 17/561,728

(22) Filed: Dec. 24, 2021

(65) Prior Publication Data
US 2022/0112929 A1 Apr. 14, 2022

Related U.S. Application Data

(63) Continuation of application No. PCT/CN2019/121121, filed on Nov. 27, 2019.

(30) Foreign Application Priority Data

Jun. 24, 2019 (CN) .......................... 201910550123.5

(51) Int. Cl.
F16D 69/02 (2006.01)
F16D 65/04 (2006.01)

(52) U.S. Cl.
CPC ........... *F16D 69/026* (2013.01); *F16D 65/04* (2013.01); *F16D 2200/0052* (2013.01);
(Continued)

(58) Field of Classification Search
CPC .. F16D 69/026; F16D 69/02; F16D 2069/002; F16D 2069/0491;
(Continued)

(56) References Cited

U.S. PATENT DOCUMENTS 4,145,223 A * 3/1979 Iwata .................... F16D 69/026
523/156
6,413,622 B1 * 7/2002 Kobayashi ............ B29C 43/006
428/293.1
(Continued)

FOREIGN PATENT DOCUMENTS

CN 101131189 2/2008
CN 102661340 9/2012
(Continued)

OTHER PUBLICATIONS

Yuzhan Jiang, et al., "Friction Material Production Technology", National Demonstration Professional Key Planning Textbook, Tianjin University Press, Jan. 31, 2018, pp. 1-17.
(Continued)

Primary Examiner — Robert A. Siconolfi
Assistant Examiner — Mahbubur Rashid
(74) Attorney, Agent, or Firm — JCIP Global Inc.

(57) ABSTRACT

The invention relates to a method for improving braking performance of a microporous friction material under wet conditions. A hydrophobic agent is added into the components for preparing microporous friction material. The microporous friction material is prepared from the following raw materials in percentage by weight: 10%-20% of nano-silica modified phenolic resin, 4%-14% of butadiene-styrene rubber, 5%-15% of glass fiber, 2%-11% of aramid pulp, 4%-15% of aluminum borate whisker, 4%-10% of hydrophobic agent and 3%-8% of calcium silicate, 1%-8% of artificial graphite, 2%-8% of coke, 2%-7% of mica, 5%-10% of cryolite and 4%-10% of diatomite.

4 Claims, 1 Drawing Sheet

(52) U.S. Cl.
CPC ............... *F16D 2200/0056* (2013.01); *F16D 2200/0069* (2013.01); *F16D 2200/0095* (2013.01); *F16D 2250/0023* (2013.01); *F16D 2250/0038* (2013.01)

(58) Field of Classification Search
CPC ..... F16D 2200/0069; F16D 2069/0475; F16D 2200/0086; F16D 2250/0038; F16D 2250/0069; F16D 2200/0056; F16D 2250/0092; C08L 2666/02; C04B 2111/00362; C04B 14/024; C04B 14/20; C04B 14/383; C04B 14/42; C04B 2103/65; C09K 3/14
See application file for complete search history.

(56) References Cited

U.S. PATENT DOCUMENTS

| | | | | |
|---|---|---|---|---|
| 6,887,549 | B2* | 5/2005 | Suzuki | F16D 69/026 523/156 |
| 7,294,188 | B2* | 11/2007 | Shao | F16D 69/026 366/144 |
| 7,306,665 | B2* | 12/2007 | Nagayoshi | F16D 69/026 428/297.4 |
| 7,740,698 | B2* | 6/2010 | Kitami | F16D 69/026 106/36 |
| 9,416,240 | B2* | 8/2016 | Zhang | C08J 9/0061 |
| 9,863,493 | B2* | 1/2018 | Kikudome | F16D 69/026 |
| 2001/0025064 | A1* | 9/2001 | Kobayashi | C08K 3/04 524/495 |
| 2015/0218333 | A1* | 8/2015 | Zhang | F16D 69/026 521/88 |

FOREIGN PATENT DOCUMENTS

| | | |
|---|---|---|
| CN | 104154146 | 11/2014 |
| CN | 103665746 | 7/2015 |
| CN | 104961872 | 10/2015 |
| CN | 105061980 | 11/2015 |
| CN | 106704422 | 5/2017 |
| CN | 106824293 | 6/2017 |
| CN | 110282907 | 9/2019 |

OTHER PUBLICATIONS

Zhang Yulong, et al., "Rubber suppressed molding products formula design and processing examples", Plastic product formula design and processing examples from books, Jan. 31, 2006, pp. 1-6.

"Office Action of China Counterpart Application", dated Feb. 3, 2021, p. 1-p. 10.

"International Search Report (Form PCT/ISA/210)" of PCT/CN2019/121121, dated Mar. 24, 2020, pp. 1-5.

* cited by examiner

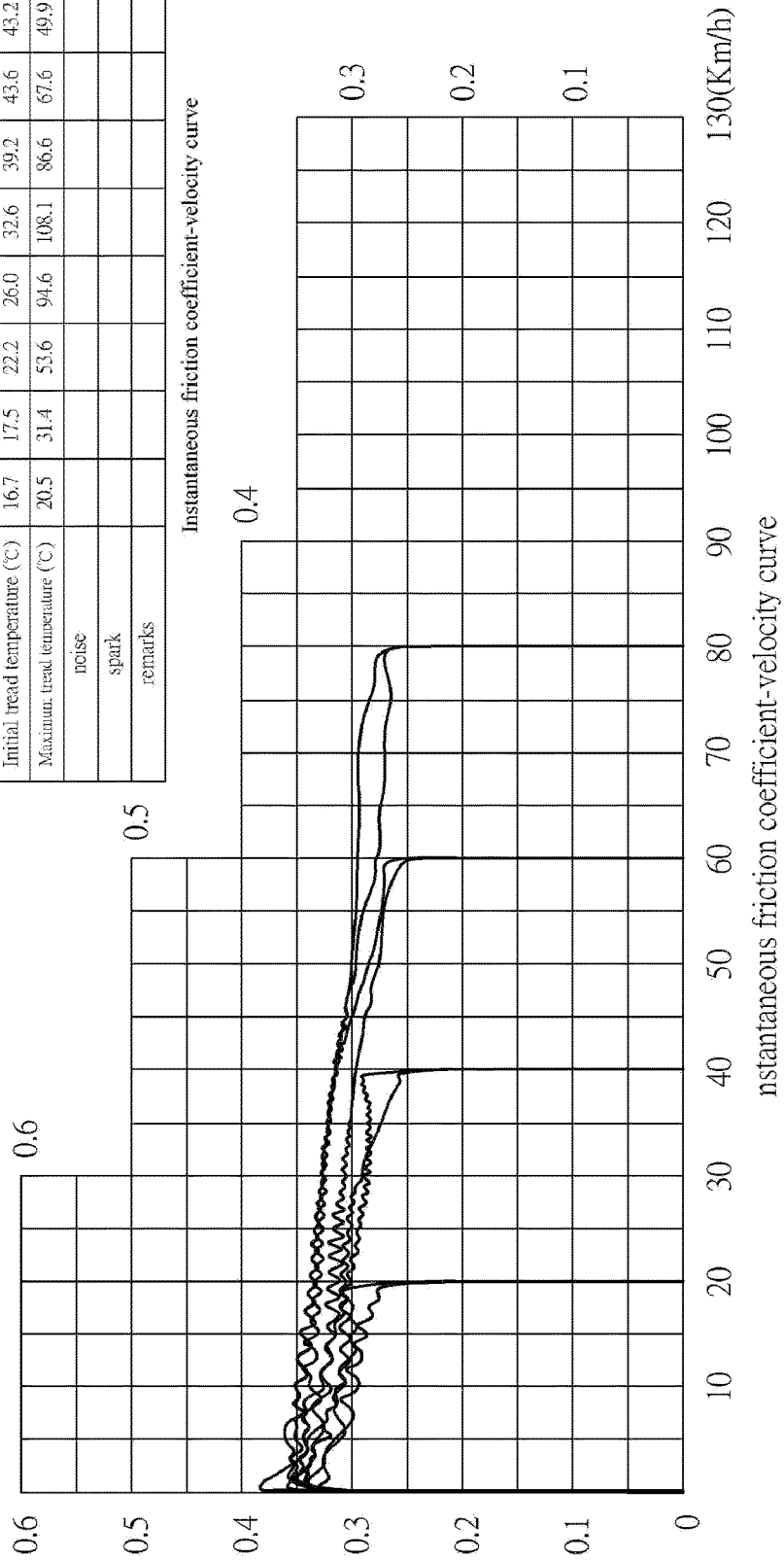

METHOD FOR IMPROVING BRAKING PERFORMANCE OF MICROPOROUS FRICTION MATERIALS UNDER WET CONDITIONS

CROSS-REFERENCE TO RELATED APPLICATION

This application is a continuation of international application of PCT application serial no. PCT/CN2019/121121 filed on Nov. 27, 2019, which claims the priority benefit of China application no. 201910550123.5, filed on Jun. 24, 2019. The entirety of each of the above mentioned patent applications is hereby incorporated by reference herein and made a part of this specification.

BACKGROUND

Technical Field

The present invention relates to a friction material, in particular to a method for improving a braking performance of a microporous friction material under wet conditions.

With the development of safety, heavy load and high speed of urban rail transit in China, composite brake shoes with high friction coefficient have become an important part of the brake system of rail transit vehicles in China. High friction coefficient composite brake shoe, referred to as high friction composite brake shoe for short, is mainly composed of friction body and steel back, in which friction body is the key component of brake shoe, which is composed of binder, reinforcing material and filler (friction performance regulator). During braking, the brake shoe and wheel tread rub to achieve the purpose of deceleration braking. The physical, mechanical and friction properties of brake shoe materials directly affect the application of brake shoes. At present, the main problems commonly existing in subway brake shoes are: an instable friction coefficient under wet conditions, hot crack, loud noise, metal inlay and wear, etc. Especially in rainy and snowy weather, the road surface is slippery. The existing composite brake shoes have a low friction coefficient under wet conditions, and the friction coefficient is instable, which will seriously endanger the running safety of subway vehicles.

At present, the surface of microporous friction materials absorbs water under wet conditions, and the braking performance is greatly reduced under wet conditions.

Chinese patent CN103665746B disclosed low-wear microporous friction material with high stability coefficient and manufacturing method thereof. But the friction coefficient of this patented material is only above 0.25 under wet conditions, and the stability coefficient is only above 85% on an MM-1000 tester.

SUMMARY

One objective of the present invention is to overcome the above-mentioned defects of the prior art and provide a method for improving braking performance of a microporous friction material under wet conditions.

According to the principle of surface tension, one or more hydrophobic agents are added into microporous friction materials to carry out hydrophobic treatment on the inner wall of microporous brake shoe, so that the friction surface has no capillary phenomenon under wet conditions such as rain and snow weather. The braking performance of the brake shoe under wet conditions can be improved, and the brake shoe has a high and stable friction coefficient under wet conditions. At the same time, it has the advantages of good heat dissipation, low noise, no metal inlay, good wear resistance, long service life and the like.

The purpose of the present invention can be achieved by the following technical scheme.

A method for improving braking performance of a microporous friction material under wet conditions, wherein a hydrophobic agent is added into components for preparing the microporous friction material, including the following components and weight percentage: 10%-20% of nano-silica modified phenolic resin, 4%-14% of butadiene-styrene rubber, 5%-15% of glass fibre, 2%-11% of aramid pulp, 4%-15% of aluminum borate whisker, 4%-10% of hydrophobic agent, 3%-8% of calcium silicate, 1%-8% of artificial graphite, 2%-8% of coke, 2%-7% of mica, 5%-10% of cryolite, and 4%-10% of diatomite.

Wherein the hydrophobic agent comprises one or more of the following substances: paraffin, stearic acid or stearate.

Paraffin wax, also known as crystalline wax, is usually a white, odorless waxy solid, which melts at 47-64° C., has a density of about 0.9 g/cm$^3$ and a boiling point range of 300-550° C. Among nonionic surfactants, paraffin wax has a hydrophilic-lipophilic HLB balance of 0 and the highest hydrophobicity.

Stearic acid is a white waxy transparent solid. It has a density of 0.941 g/cm$^3$, a melting point of 67-69° C. and a boiling point of 376.1° C. It is insoluble in water, slightly soluble in cold ethanol, and easier to dissolve when heated.

Wherein the stearate includes magnesium stearate, calcium stearate, zinc stearate and iron stearate.

Magnesium stearate is a white powder. It has a density of 1.028 g/cm$^3$, a melting point of 88.5° C., and a boiling point of 359.4° C. It is insoluble in water, ethanol or ether.

Calcium stearate is a white powder. It has a density of 1.08 g/cm$^3$, a melting point of 147-149° C., and a boiling point 359.4° C. It is insoluble in water, cold ethanol and ether, soluble in organic solvents such as hot benzene, benzene and turpentine, slightly soluble in hot ethanol and ether.

Zinc stearate is a white powder. It has a density of 1.095 g/cm$^3$, a melting point of 118-125° C. It is insoluble in water, and has a boiling point of 359.4° C.

Iron stearate is an orange powder, nontoxic, odorless, tasteless and nonflammable, insoluble in water, soluble in hot organic solvents such as ethanol, ether, chloroform, acetone, turpentine and benzene. The melting point is greater than 105° C.

The nano-silica modified phenolic resin can be obtained by existing technical means, such as patent CN201710127324.5 and patent CN201510439876.0. Nano-silica is an amorphous white powder with small particle size, large specific surface area and high surface energy. Using modified phenolic resin, silica and macromolecules are combined into a cubic network structure, thus improving the heat resistance, wear resistance, strength and elasticity of the material.

Wherein the particle size of butadiene-styrene rubber powder is 80 mesh. And it has wear resistance and heat resistance.

Wherein the glass fiber is a chopped glass fiber and an inorganic nonmetallic material with excellent performance, and has the advantages of good insulation, strong heat resistance, good corrosion resistance, high mechanical strength and low price.

Wherein the aramid pulp is obtained by surface fibrillation treatment of aramid fiber, and its unique surface structure greatly improves the adhesion of the mixture. So it is very suitable for being used as a reinforcing fiber in friction materials.

Wherein the aramid pulp has the advantages of high strength, good dimensional stability, no brittleness, high temperature resistance, corrosion resistance, toughness, small shrinkage, good wear resistance and large surface area, and can be well combined with other substances. It is a reinforcing material with an average length of 4-6 mm. Aramid pulp is mixed with glass fiber, which plays the role of fiber mixing and strengthening.

Wherein the aluminum borate whisker has a density of 2.93 g/cm$^3$, a melting point of 1440-1460° C., a heat-resistant temperature of 1200° C., a Mohs hardness of 7, a tensile strength of 7.84 GPa and a tensile elastic modulus of 392 GPa. It has high elasticity, good mechanical strength, heat resistance, acid resistance and electrical insulation. Aluminum borate whisker, glass fiber and aramid pulp are used as reinforcing materials in friction materials by using the coupling between fibers to achieve the purpose of hybrid reinforcement.

Wherein the calcium silicate is a white powder, tasteless and nontoxic, soluble in strong acid, insoluble in water, alcohol and alkali, and mostly needle-like crystals. Calcium silicate has a high temperature resistance, moderate hardness (Mohs hardness 5-6), little damage to the dual, and plays a role in increasing wear in friction materials. Calcium silicate and resin play a binding role together to improve the overall strength of the material.

Wherein the cryolite, also known as sodium hexafluoro-aluminate, is a fine white crystal, odorless, with a specific gravity of 3, Mohs hardness of 2-3, melting point of 1009° C., low wear rate, and can be used as a good friction regulator in friction materials with a particle size of 200-300 mesh.

Wherein the artificial graphite has a porous structure and adsorbability, and has a certain effect on improving thermal decay and reducing noise. The particle size of the artificial graphite is 20-60 meshes.

Wherein the coke of the invention is a friction performance regulator in friction materials, which is used as an antifriction material. It has a loose structure and can reduce noise.

Wherein the mica has good heat resistance and insulation, and can be used as an antifriction material.

Wherein the diatomite has a loose porous structure, strong adsorption capacity, good heat resistance, reduced noise and heat decay, and SiO$_2$ content in diatomite is more than or equal to 85%. The specification of the diatomite powder is 100 mesh.

Wherein the method for improving braking performance of the microporous friction material specifically comprises the following steps.

(1) Preparation of raw materials, including the following components and weight percentage: 10%-20% of nano-silica modified phenolic resin, 4%-14% of butadiene-styrene rubber, 5%-15% of glass fibre, 2%-11% of aramid pulp, 4%-15% of aluminum borate whisker, 4%-10% of hydrophobic agent, 3%-8% of calcium silicate, 1%-8% of artificial graphite, 2%-8% of coke, 2%-7% of mica, 5%-10% of cryolite, and 4%-10% of diatomite.

(2) Preparation, including the following steps.

Adding the above components into a high-speed rake mixer and mixing the components, a mixture is obtained, and placing the steel back and the mixture in a shaping mold for compression molding, a blank is obtained.

The blank is put into an oven to be heated and cured, and machining is carried out to obtain the brake shoe.

The components are added into a high-speed rake mixer to be mixed. The rotating speed is 2500 r/min, and the mixing time is 25-40 min.

During compressing, the mold temperature is 60-100° C., the molding pressure is 20-30 MPa, the air is deflated 5-10 times within 10 minutes, and then the pressure is kept for 15-25 minutes.

The conditions for heating and curing are as follows: putting the blank in an oven for programmed heating and curing heat treatment, wherein the heating time of every two intervals is 60 min.

A specific curing temperature and a specific curing time are: the curing time is 2-3 h when the curing temperature is 200° C., the curing time is 2-3 h when the curing temperature is 220° C., the curing time is 3.5-4 h when the curing temperature is 240° C., the curing time is 3-4 h when the curing temperature is 260° C., the curing time is 1-2 h when the curing temperature is 280° C., and the curing time is 5-6 h when the curing temperature is 300° C.

Due to the addition of hydrophobic agent, the braking performance of the material under wet conditions is improved. Nano-silica modified phenolic resin, due to the combination of silica and phenolic resin, has a three-dimensional network structure, which improves the heat resistance and wear resistance of the material. The use of hybrid fibers, such as glass fiber, aramid pulp and aluminum borate whisker, gives full play to their respective advantages and achieves the effect of hybrid reinforcement, which not only ensures the strength of materials but also ensures the friction and wear performance of products. Artificial graphite, coke, diatomaceous earth, etc. have loose porous structure, strong adsorption, which can effectively reduce noise. Porous materials have large gaps and fast heat dissipation. According to the invention, by reasonably selecting raw materials such as hydrophobic agent, resin, fiber, wear-increasing material and friction performance regulator, and controlling the proportion among the raw materials, and adopting a special production process, the prepared microporous brake shoe has a high and stable friction coefficient under wet conditions, greatly improves the braking performance of the brake shoe under wet conditions, improves the thermal recession. The brake shoe has no metal inlay, low noise and good wear resistance, and prolongs the service life of the brake shoe, and simultaneously ensures that the friction material does not cause abnormal wear on the wheel tread.

According to the invention, a hydrophobic agent is added into the formula, and the basic principle is that during the curing of the microporous brake shoe and formation of micropores, the hydrophobic agent is heated and melted, molecules of the hydrophobic agent gradually migrate to an inner wall of the micropores by using a principle of surface tension, and a uniform, dense and stable film is formed on the inner wall of the micropores, so that a macroscopic surface of the microporous friction material has no capillary phenomenon and shows hydrophobic characteristics, which is beneficial to the improvement of wet friction coefficient. The friction surface of prepared brake shoe has no capillary phenomenon under wet conditions such as rain and snow weather, which can improve the braking performance under wet conditions. This technology has the advantages of simple technological process, no pollution, less consumables, uniform and compact film formation and strong bonding force with the substrate.

Compared with the prior art, the invention has the following advantages and beneficial effects.

1. The invention adopts artificial graphite, coke and diatomite. These raw materials have loose and porous structure and good adsorption, and have certain effect on reducing noise and improving thermal decay. Besides the raw materials, the production process also has a great influence on the material performance. The invention adopts a special production process combined with programmed heating curing heat treatment. This programmed heating curing has slower heating rate, more uniform material curing, which can eliminate stress concentration and stable product quality.

2. Due to the addition of the hydrophobic agent, the prepared microporous brake shoe has a high and stable friction coefficient under wet conditions, which improves the braking performance of the brake shoe, and the friction coefficient reaches more than 0.30 under wet conditions.

3. The nano-silica modified phenolic resin of the present invention has improved heat resistance and wear resistance due to the combination of silica and phenolic resin into a three-dimensional network structure. The use of hybrid fibers, such as glass fiber, aramid pulp and aluminum borate whisker, achieves the effect of hybrid reinforcement, which not only ensures the strength of microporous materials, but also ensures the friction and wear performance of products. Artificial graphite, coke, diatomite, etc. have loose porous structure, which can effectively reduce noise. Porous structure materials have large gaps and fast heat dissipation. According to the invention, by reasonably selecting raw materials such as hydrophobic agent, resin, fiber, friction modifier, etc. and controlling the proportion among the raw materials, and adopting a special production process, the prepared microporous brake shoe has a high and stable friction coefficient under wet conditions, which improves the braking performance of the brake shoe under wet conditions, and the thermal recession, The microporous brake shoe has no metal inlay and has low noise and good wear resistance, which prolongs the service life of the brake shoe, and at the same time, the wheel tread is smooth and crack-free.

BRIEF DESCRIPTION OF THE DRAWINGS

FIGURE is a graph of instantaneous friction coefficient-velocity curve of the brake shoe in the first embodiment of the present invention. When the brake shoe thrust is 22 kN and the brake shoe is in a stopping brake under wet conditions.

DESCRIPTION OF THE EMBODIMENTS

The present invention is described in detail below with reference to attached drawings and specific embodiments.

Embodiment 1

A method for improving a braking performance of a microporous friction material under wet conditions, wherein a hydrophobic agent is added into components for preparing the microporous friction material, specifically comprising the following steps.

(1) Preparation of raw materials, including the following components and weight percentage: 10% of nano-silica modified phenolic resin, 10% of butadiene-styrene rubber, 12% of glass fibre, 2% of aramid pulp, 9% of aluminum borate whisker, 10% of hydrophobic agent, 8% of calcium silicate, 8% of artificial graphite, 8% of coke, 7% of mica, 6% of cryolite, and 10% of diatomite.

(2) Preparation

Adding the above components into a high-speed rake mixer and mixing the components, a mixture is obtained, and placing a steel back and the mixture in a shaping mold for compression molding, a blank is obtained; and the blank is put into an oven to be heated and cured, and machining is carried out to obtain a brake shoe.

Mixing: The components are added into the high-speed rake mixer according to a certain proportion, and a rotating speed is 2500 r/min, and a mixing time is 25 min;

Pressing: Placing the mixture and steel back in a shaping mold for compression molding, wherein during the compression molding, a mold temperature is 60° C., a molding pressure is 20 MPa, air is deflated 5 times within 10 min, and then the molding pressure is kept for 15 min.

Curing heat treatment: Putting the blank in an oven for programmed heating and curing heat treatment, wherein the heating time of every two intervals is 60 min. See Table 1 below for specific methods.

TABLE 1

Curing temperature and curing time of brake shoes

| Curing temperature/° C. | Curing time/h |
|---|---|
| 200 | 2 |
| 220 | 2 |
| 240 | 3.5 |
| 260 | 4 |
| 280 | 2 |
| 300 | 5 |

Embodiment 2

A method for improving a braking performance of a microporous friction material under wet conditions, wherein a hydrophobic agent is added into components for preparing the microporous friction material, specifically comprising the following steps.

(1) Preparation of raw materials, including the following components and weight percentage: 16% of nano-silica modified phenolic resin, 12% of butadiene-styrene rubber, 15% of glass fibre, 11% of aramid pulp, 15% of aluminum borate whisker, 4% of hydrophobic agent, 3% of calcium silicate, 7% of artificial graphite, 2% of coke, 6% of mica, 5% of cryolite, and 4% of diatomite.

(2) Preparation

Adding the above components into a high-speed rake mixer and mixing the components, a mixture is obtained, and placing a steel back and the mixture in a shaping mold for compression molding, a blank is obtained; and the blank is put into an oven to be heated and cured, and machining is carried out to obtain a brake shoe.

Mixing: The components are added into the high-speed rake mixer according to a certain proportion, and a rotating speed is 2500 r/min, and a mixing time is 30 min;

Pressing: Placing the mixture and steel back in a shaping mold for compression molding, wherein during the compression molding, a mold temperature is 80° C., a molding pressure is 25 MPa, air is deflated 10 times within 10 min, and then the molding pressure is kept for 20 min.

Curing heat treatment: Putting the blank in an oven for programmed heating and curing heat treatment, wherein the heating time of every two intervals is 60 min. See Table 2 below for specific methods.

TABLE 2

| Curing temperature and curing time of brake shoes | |
|---|---|
| Curing temperature/° C. | Curing time/h |
| 200 | 2.5 |
| 220 | 2.5 |
| 240 | 3.5 |
| 260 | 4 |
| 280 | 2 |
| 300 | 5 |

Embodiment 3

A method for improving a braking performance of a microporous friction material under wet conditions, wherein a hydrophobic agent is added into components for preparing the microporous friction material, specifically comprising the following steps.

Preparation of raw materials, including the following components and weight percentage: 18% of nano-silica modified phenolic resin, 14% of butadiene-styrene rubber, 5% of glass fibre, 9% of aramid pulp, 4% of aluminum borate whisker, 9% of hydrophobic agent, 7% of calcium silicate, 6% of artificial graphite, 6% of coke, 6% of mica, 9% of cryolite, and 7% of diatomite.

(2) Preparation

Adding the above components into a high-speed rake mixer and mixing the components, a mixture is obtained, and placing a steel back and the mixture in a shaping mold for compression molding, a blank is obtained; and the blank is put into an oven to be heated and cured, and machining is carried out to obtain a brake shoe.

Mixing: The components are added into the high-speed rake mixer according to a certain proportion, and a rotating speed is 2500 r/min, and a mixing time is 35 min;

Pressing: Placing the mixture and steel back in a shaping mold for compression molding, wherein during the compression molding, a mold temperature is 100° C., a molding pressure is 30 MPa, air is deflated 7 times within 10 min, and then the molding pressure is kept for 25 min.

Curing heat treatment: Putting the blank in an oven for programmed heating and curing heat treatment, wherein the heating time of every two intervals is 60 min. See Table 3 below for specific methods.

TABLE 3

| Curing temperature and curing time of brake shoes | |
|---|---|
| Curing temperature/° C. | Curing time/h |
| 200 | 3 |
| 220 | 2.5 |
| 240 | 4 |
| 260 | 3 |
| 280 | 1 |
| 300 | 6 |

Embodiment 4

A method for improving a braking performance of a microporous friction material under wet conditions, wherein a hydrophobic agent is added into components for preparing the microporous friction material, specifically comprising the following steps.

Preparation of raw materials, including the following components and weight percentage: 20% of nano-silica modified phenolic resin, 4% of butadiene-styrene rubber, 13% of glass fibre, 8% of aramid pulp, 12% of aluminum borate whisker, 8% of hydrophobic agent, 6% of calcium silicate, 1% of artificial graphite, 7% of coke, 2% of mica, 10% of cryolite, and 9% of diatomite.

(2) Preparation

Adding the above components into a high-speed rake mixer and mixing the components, a mixture is obtained, and placing a steel back and the mixture in a shaping mold for compression molding, a blank is obtained; and the blank is put into an oven to be heated and cured, and machining is carried out to obtain a brake shoe.

Mixing: The components are added into the high-speed rake mixer according to a certain proportion, and a rotating speed is 2500 r/min, and a mixing time is 40 min;

Pressing: Placing the mixture and steel back in a shaping mold for compression molding, wherein during the compression molding, a mold temperature is 90° C., a molding pressure is 28 MPa, air is deflated 8 times within 10 min, and then the molding pressure is kept for 22 min.

Curing heat treatment: Putting the blank in an oven for programmed heating and curing heat treatment, wherein the heating time of every two intervals is 60 min. See Table 4 below for specific methods.

TABLE 4

| Curing temperature and curing time of brake shoes | |
|---|---|
| Curing temperature/° C. | Curing time/h |
| 200 | 2 |
| 220 | 3 |
| 240 | 4 |
| 260 | 3.5 |
| 280 | 1.5 |
| 300 | 5.5 |

No hydrophobic agent is added, the rest of the formula composition and production process are completely the same as those in the embodiment 1, and the prepared brake shoe is denoted as X. According to CZJS/T 0013-2016 technical specification for composite brake shoes for urban rail vehicles, the physical and chemical properties of the brake shoe prepared in the embodiment and the brake shoe X are tested, and the results are shown in Table 5.

TABLE 5

| physical performance test data of brake shoes | | | | | |
|---|---|---|---|---|---|
| | Embodiment 1 | Embodiment 2 | Embodiment 3 | Embodiment 4 | X |
| Density (g/cm$^3$) | 1.40 | 1.43 | 1.45 | 1.50 | 1.60 |
| Hardness (HRR) | 55 | 58 | 60 | 70 | 85 |
| Impact strength (kJ/m$^2$) | 2.0 | 2.5 | 2.8 | 3.0 | 1.8 |
| compressive strength (MPa) | 50 | 55 | 60 | 70 | 62 |
| Compression modulus (MPa) | 640 | 680 | 700 | 750 | 850 |

The physical and chemical properties of the brake shoe prepared in the embodiment completely meet the standard requirements.

For the brake shoe prepared in the embodiment and the brake shoe X, the friction performances of the brake shoe are tested by using the scale bench MM-1000, and the results are shown in Table 6.

TABLE 6

MM-1000 test data of the brake shoe

Friction coefficient under wet conditions

| Test item Speed/km/h | Embodiment 1 | Embodiment 2 | Embodiment 3 | Embodiment 4 | X |
|---|---|---|---|---|---|
| 20 | 0.308 | 0.300 | 0.316 | 0.301 | 0.240 |
| 40 | 0.303 | 0.316 | 0.315 | 0.307 | 0.264 |
| 60 | 0.309 | 0.318 | 0.312 | 0.310 | 0.240 |
| 80 | 0.311 | 0.320 | 0.318 | 0.317 | 0.234 |
| 100 | 0.319 | 0.323 | 0.320 | 0.325 | 0.230 |
| Average friction coefficient | 0.310 | 0.315 | 0.316 | 0.312 | 0.242 |
| Average stability coefficient/% | 90 | 91 | 90 | 92 | 76 |

TABLE 6-continued

MM-1000 test data of the brake shoe

Friction coefficient under wet conditions

| Test item Speed/km/h | Embodiment 1 | Embodiment 2 | Embodiment 3 | Embodiment 4 | X |
|---|---|---|---|---|---|
| Average wear rate/cm$^3$/MJ | 0.04 | 0.05 | 0.06 | 0.07 | 0.13 |

From Table 6, it can be seen that the friction coefficient of the brake shoe prepared in the embodiment does not decrease with the increase of speed under wet conditions, but can still be kept above 0.30, and the stability coefficient can reach above 90%.

Referring to CZJS/T 0013-2016 technical specification for composite brake shoes for urban rail vehicles, a 1:1 bench test is conducted in the Product Quality Supervision and Inspection Center of the Ministry of Railways, and the friction and wear performance test is conducted. The test results are shown in Tables 7-1 and 7-2.

TABLE 7-1

The 1:1 bench test data of the brake shoe

| | | Test condition | | Test result | | | | |
|---|---|---|---|---|---|---|---|---|
| Serial number | Inspection item | Braking speed (km/h) | Brake shoe pressure (kN) | Braking distance (m) | Braking time (s) | Average friction coefficient/ | Initial tread temperature (° C.) | Maximum tread temperature (° C.) |
| 1 | Primary parking brake under dry conditions | 20 | 22 | 17.9 | 8.0 | 0.321 | 27.6 | 31.9 |
| | | 40 | | 67.3 | 14.8 | 0.341 | 28.8 | 49.8 |
| | | 60 | | 158.5 | 20.0 | 0.326 | 37.0 | 79.6 |
| | | 80 | | 309.7 | 27.6 | 0.350 | 33.0 | 126.9 |
| | | 80 | | 296.9 | 28.1 | 0.359 | 21.4 | 121.5 |
| | | 60 | | 144.4 | 19.0 | 0.358 | 34.8 | 97.4 |
| | | 40 | | 62.8 | 12.2 | 0.366 | 35.7 | 68.7 |
| | | 20 | | 17.2 | 8.6 | 0.334 | 37.3 | 43.5 |
| 2 | Dry state of primary parking brake | 20 | 44 | 9.1 | 6.7 | 0.318 | 22.3 | 35.0 |
| | | 40 | | 33.3 | 9.2 | 0.347 | 24.6 | 83.1 |
| | | 60 | | 80.0 | 12.6 | 0.325 | 26.8 | 176.7 |
| | | 80 | | 152.2 | 15.9 | 0.335 | 32.7 | 146.4 |
| | | 80 | | 157.6 | 17.8 | 0.330 | 15.6 | 162.7 |
| | | 60 | | 84.5 | 12.5 | 0.307 | 32.7 | 148.6 |
| | | 40 | | 36.4 | 10.0 | 0.317 | 28.7 | 56.5 |
| | | 20 | | 9.1 | 6.7 | 0.318 | 36.2 | 42.1 |
| 3 | Simulated operation test under dry conditions | 80 | 33 | 235.9 | 21.4 | 0.261 | 17.3 | 71.4 |
| | | 80 | | 230.9 | 21.1 | 0.265 | 34.6 | 143.3 |
| | | 80 | | 224.3 | 21.0 | 0.273 | 57.5 | 171.3 |
| | | 80 | | 214.9 | 21.9 | 0.285 | 71.2 | 191.8 |
| | | 80 | | 217.8 | 20.8 | 0.282 | 79.4 | 233.5 |
| | | 80 | | 223.1 | 21.8 | 0.275 | 103.4 | 250.5 |
| | | 80 | | 225.7 | 21.3 | 0.272 | 104.5 | 245.6 |
| | | 80 | | 222.5 | 21.6 | 0.276 | 126.6 | 235.3 |
| | | 80 | | 218.0 | 20.8 | 0.281 | 131.8 | 265.3 |
| | | 80 | | 221.2 | 21.7 | 0.277 | 141.0 | 255.9 |
| | | 80 | | 211.6 | 20.7 | 0.290 | 145.0 | 265.5 |
| | | 80 | | 219.1 | 20.7 | 0.280 | 151.7 | 276.0 |
| | | 80 | | 209.6 | 20.5 | 0.293 | 157.3 | 275.5 |
| | | 80 | | 219.6 | 21.0 | 0.279 | 161.4 | 280.0 |
| | | 80 | | 213.1 | 20.0 | 0.288 | 164.1 | 275.2 |
| | | 80 | | 210.6 | 19.6 | 0.291 | 144.2 | 276.8 |
| | | 80 | | 205.9 | 19.7 | 0.298 | 163.1 | 274.6 |
| | | 80 | | 206.0 | 19.6 | 0.298 | 169.5 | 277.0 |
| | | 80 | | 205.3 | 19.5 | 0.299 | 174.7 | 275.6 |
| | | 80 | | 214.4 | 21.2 | 0.286 | 171.5 | 280.5 |

Remarks: Parking interval 120 s in the "Simulated operation test under dry conditions"

TABLE 7-2

The 1:1 bench test data of the brake shoe

| Serial numb | Inspection item | Test condition | | | Test result | | | |
|---|---|---|---|---|---|---|---|---|
| 4 | Static friction test | Brake shoe pressure 5.0 kN | | | average value 0.548 | | | |
| | | Braking speed (km/h) | Brake shoe pressure (kN) | Braking distance (m) | Braking time (s) | Average friction coefficient/ | Initial tread temperature (° C.) | Maximum tread temperature (° C.) |
| 5 | Primary parking brake under wet conditions | 20 | 22 | 19.5 | 8.2 | 0.294 | 16.7 | 20.5 |
| | | 40 | | 76.7 | 14.6 | 0.299 | 17.5 | 31.4 |
| | | 60 | | 171.0 | 21.0 | 0.301 | 22.2 | 53.6 |
| | | 80 | | 305.0 | 27.6 | 0.300 | 26.0 | 94.6 |
| | | 80 | | 296.8 | 27.2 | 0.309 | 32.6 | 108.1 |
| | | 60 | | 164.4 | 21.2 | 0.314 | 39.2 | 86.6 |
| | | 40 | | 75.6 | 15.1 | 0.303 | 43.6 | 67.6 |
| | | 20 | | 18.8 | 8.1 | 0.305 | 43.2 | 49.9 |
| 6 | Wear of the brake shoe | parking brake under dry conditions | | | 1.2 g | | | |
| | | simulated operation test under dry conditions | | | 7.2 g | | | |
| | | parking brake under wet conditions | | | 0.5 g | | | |

Remarks: average sprinkling amount 14 L/h in the "Primary parking brake under wet conditions"

The friction coefficient of the brake shoe is relatively stable and there is no thermal decay phenomenon under different pressures of stopping brake and simulated operation test under dry conditions. Under wet conditions, the friction coefficient does not decrease, the average friction coefficient remained above 0.30, and the stability is high. During the whole test process, the brake shoe does not appear peeling, falling block and metal inlaying, and the brake is noiseless and less worn. The dual wheel tread is smooth without cracks.

FIGURE is a graph of instantaneous friction coefficient-velocity curve of the brake shoe in the first embodiment of the present invention. When the brake shoe thrust is 22 kN and the brake shoe is in a stopping brake under wet conditions.

According to the invention, the hydrophobic agent is added to carry out hydrophobic treatment on the inner wall of the microporous material, so that the friction coefficient of the microporous material under wet conditions does not decrease, and the microporous material has a high friction coefficient. By adopting the technology of the invention, the friction coefficient under wet conditions can be kept above 0.30 whether it is on a MM-1000 scale bench test or a 1:1 bench test, and the stability of the friction coefficient is higher, which can reach above 90% on the MM-1000 tester. The wear rate of materials is lower and the service life is longer.

The above description of the embodiments is for the convenience of ordinary technicians in the technical field to understand and use the invention. It is obvious that those skilled in the art can easily make various modifications to these embodiments and apply the general principles described herein to other embodiments without creative labor. Therefore, the present invention is not limited to the above-mentioned embodiments, and the improvements and modifications made by those skilled in the art according to the disclosure of the present invention without departing from the scope of the present invention should be within the scope of the present invention.

What is claimed is:

1. A method for improving braking performance of a microporous friction material under wet conditions, wherein a hydrophobic agent is added into components for preparing the microporous friction material, comprising the following steps:

step 1, preparation of raw materials, including the following components and weight percentage: 10%-20% of nano-silica modified phenolic resin, 4%-14% of butadiene-styrene rubber, 5%-15% of glass fibre, 2%-11% of aramid pulp, 4%-15% of aluminum borate whisker, 4%-10% of hydrophobic agent, 3%-8% of calcium silicate, 1%-8% of artificial graphite, 2%-8% of coke, 2%-7% of mica, 5%-10% of cryolite, and 4%-10% of diatomite, wherein the hydrophobic agent comprises one or more of the following substances: paraffin, stearic acid or stearate, wherein the stearate includes magnesium stearate, calcium stearate, zinc stearate and iron stearate;

step 2, preparation, including the following steps:

adding the above components into a high-speed rake mixer and mixing the components, a mixture is obtained, and placing a steel back and the mixture in a shaping mold for compression molding, a blank is obtained; and the blank is put into an oven to be heated and cured, and machining is carried out to obtain a brake shoe, wherein during the compression molding, a mold temperature is 60-100° C., a molding pressure is 20-30 MPa, air is deflated 5-10 times within 10 min, and then the molding pressure is kept for 15-25 min, wherein conditions for the heating and the curing are: putting the blank in the oven for programmed heating and curing heat treatment, wherein a heating time of every two intervals is 60 min, wherein a specific curing temperature and a specific curing time are: the curing time is 2-3 h when the curing temperature is 200° C., the curing time is 2-3 h when the curing temperature is 220° C., the curing time is 3.5-4 h when the curing temperature is 240° C., the curing time is 3-4 h when the curing temperature is 260° C., the curing time is 1-2 h when the curing temperature is 280° C., and the curing time is 5-6 h when the curing temperature is 300° C., wherein during the curing of the microporous brake shoe and formation of micropores, the hydrophobic agent is heated and melted, molecules of the hydrophobic agent gradually migrate to an inner wall of the micropores by using a principle of surface tension, and a uniform, dense and stable film is formed on the inner wall of the micropores, so that a macroscopic surface of the microporous friction material has no capillary phenomenon and shows hydrophobic characteristics, wherein a friction coefficient of the microporous friction material under wet conditions is more than 0.30.

2. The method for improving the braking performance of the microporous friction material under wet conditions according to claim 1, wherein a particle size of the cryolite is 200-300 mesh.

3. The method for improving the braking performance of the microporous friction material under wet conditions according to claim 1, wherein a particle size of the artificial graphite is 20-60 mesh.

4. The method for improving the braking performance of the microporous friction material under wet conditions according to claim 1, wherein the components are added into the high-speed rake mixer according to a certain proportion, and a rotating speed is 2500 r/min, and a mixing time is 25-40 min.

* * * * *